Figure 9:
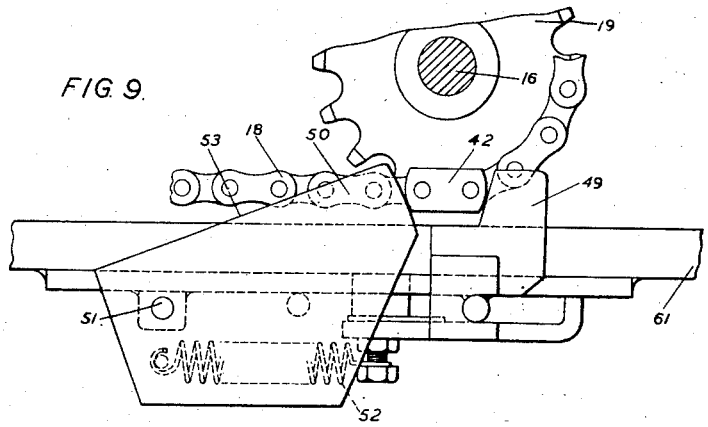

Sept. 18, 1956  J. W. SMITH  2,763,232
APPARATUS FOR TREATING WITH LIQUID A BODY
HAVING IRREGULAR NON-SYMMETRICAL SURFACES
Filed Feb. 5, 1954
7 Sheets-Sheet 1
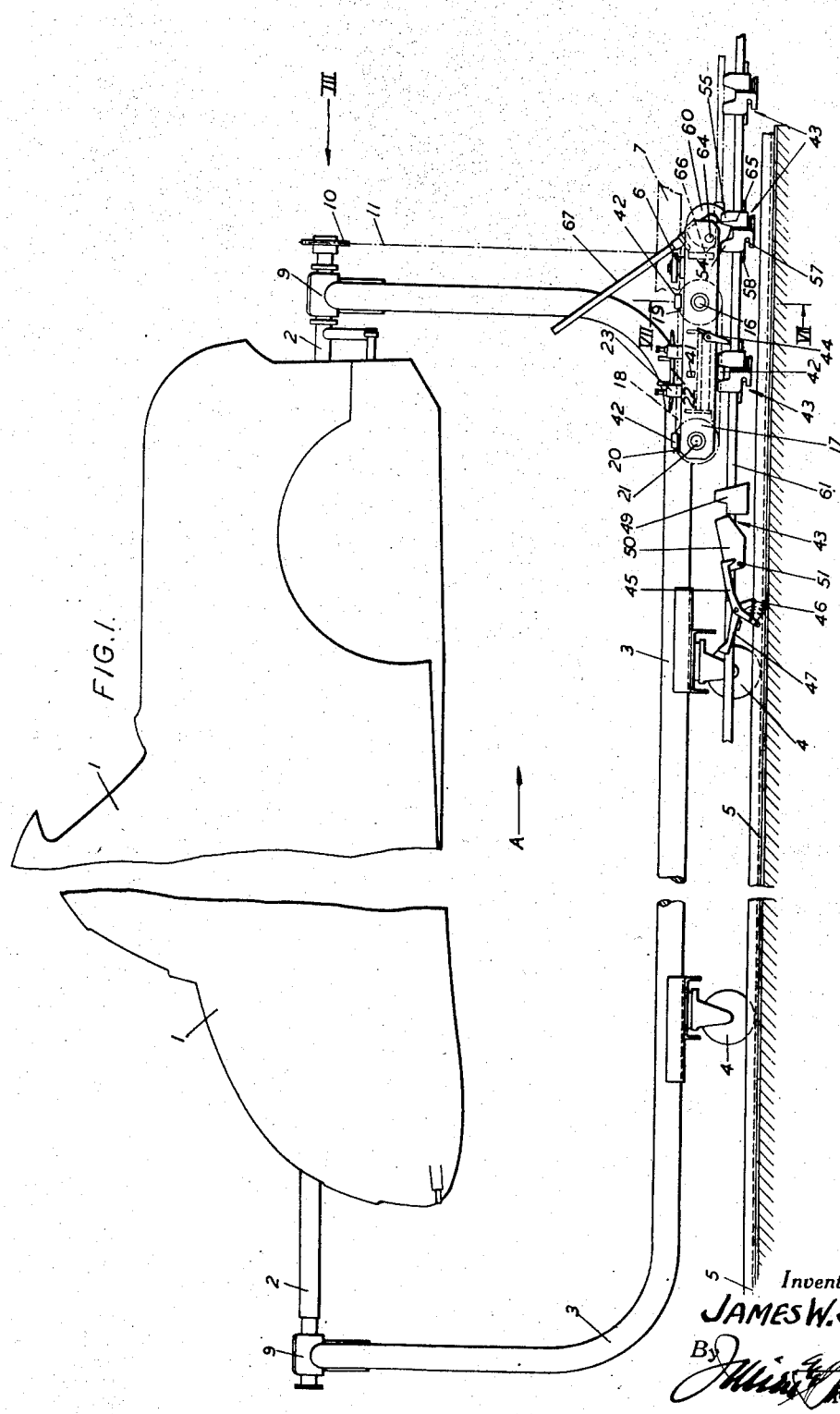
Inventor
JAMES W. SMITH

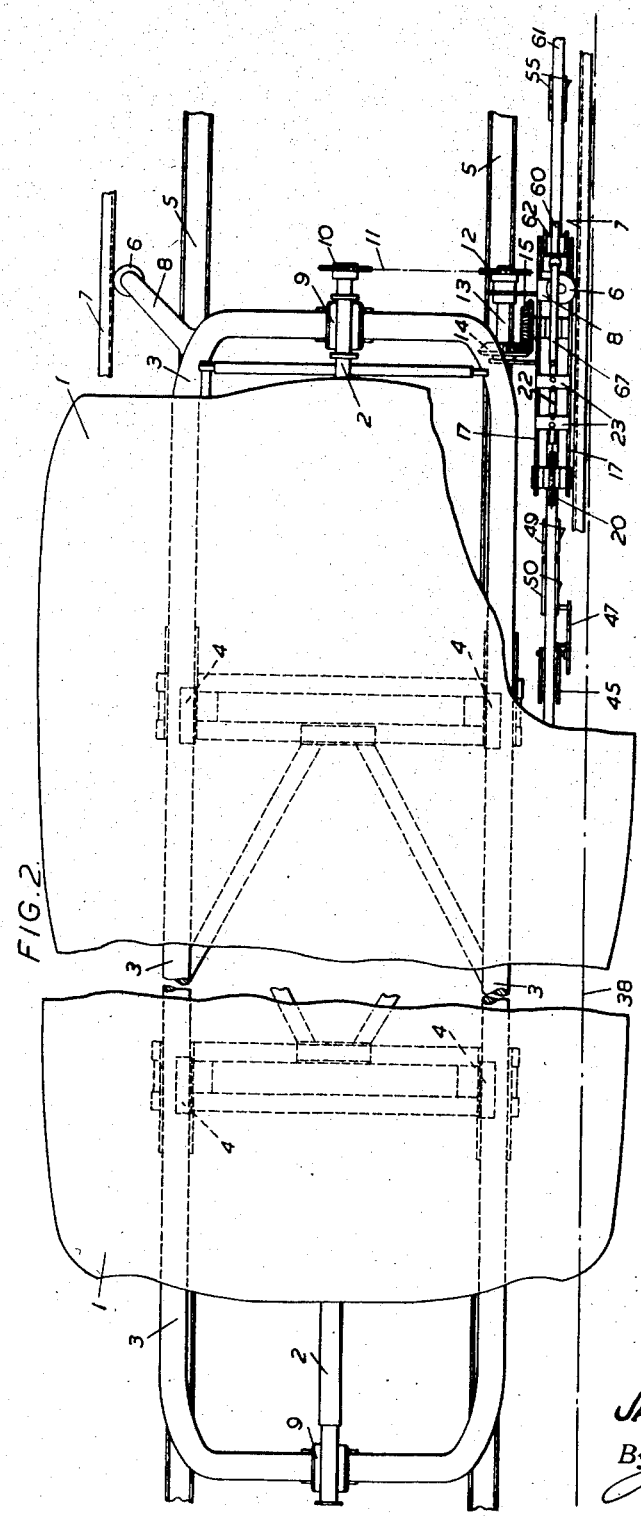

Sept. 18, 1956  
J. W. SMITH  
2,763,232  
APPARATUS FOR TREATING WITH LIQUID A BODY  
HAVING IRREGULAR NON-SYMMETRICAL SURFACES  
Filed Feb. 5, 1954  
7 Sheets-Sheet 3
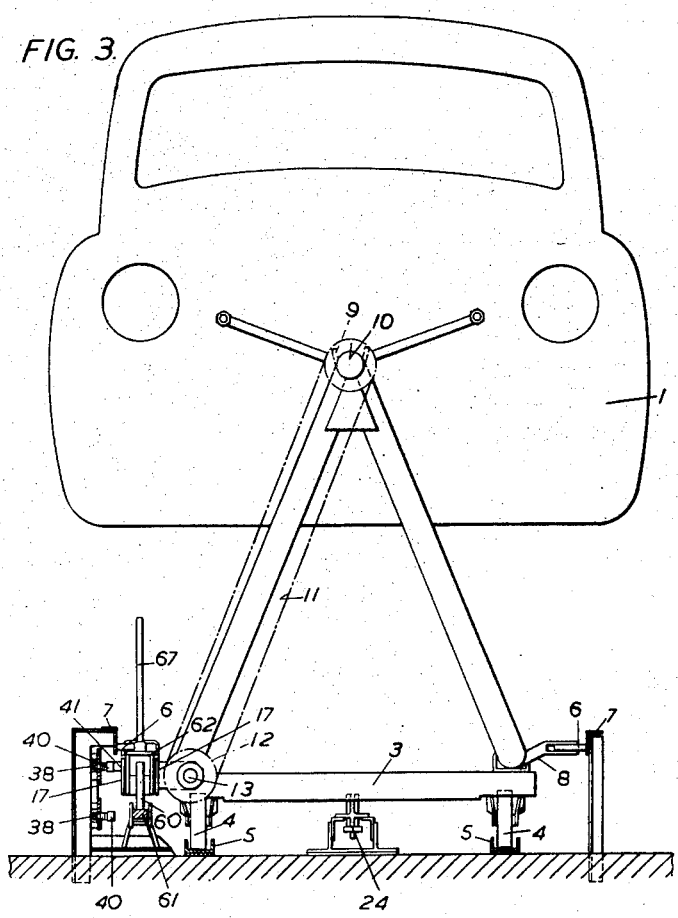
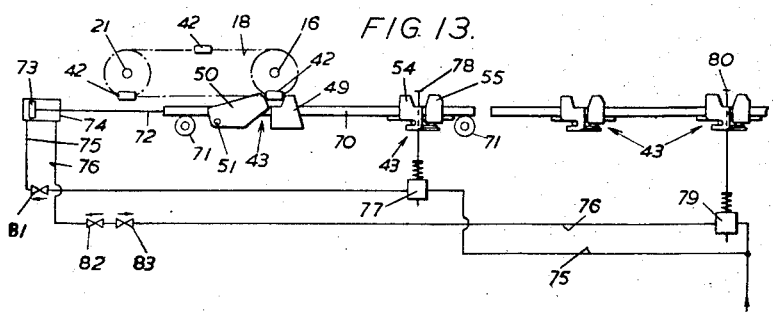
Inventor
JAMES W. SMITH

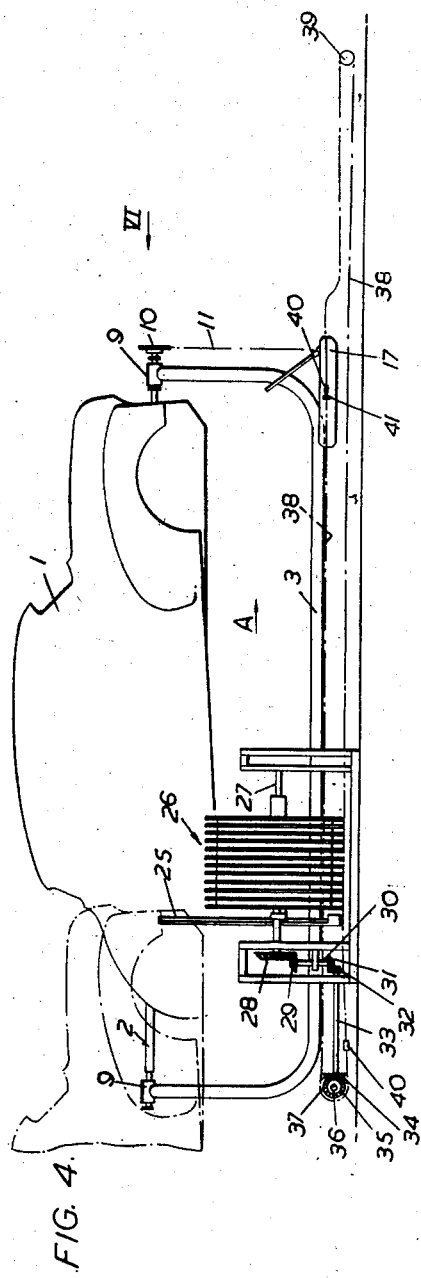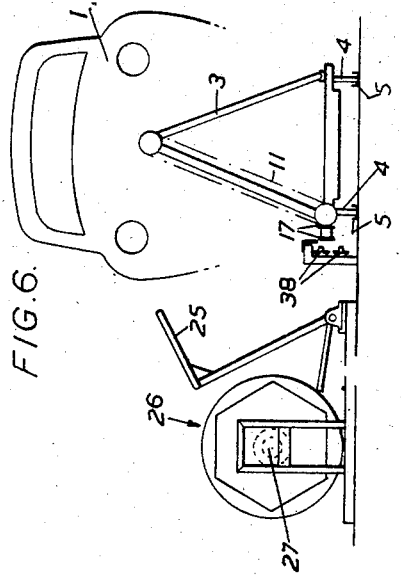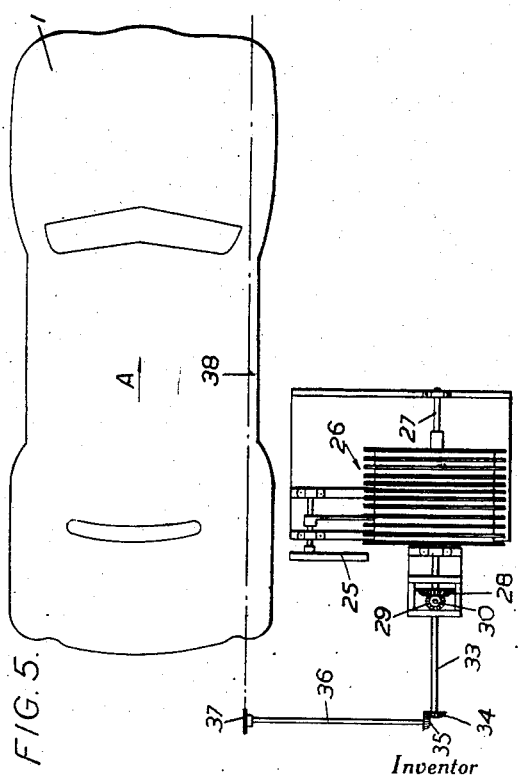

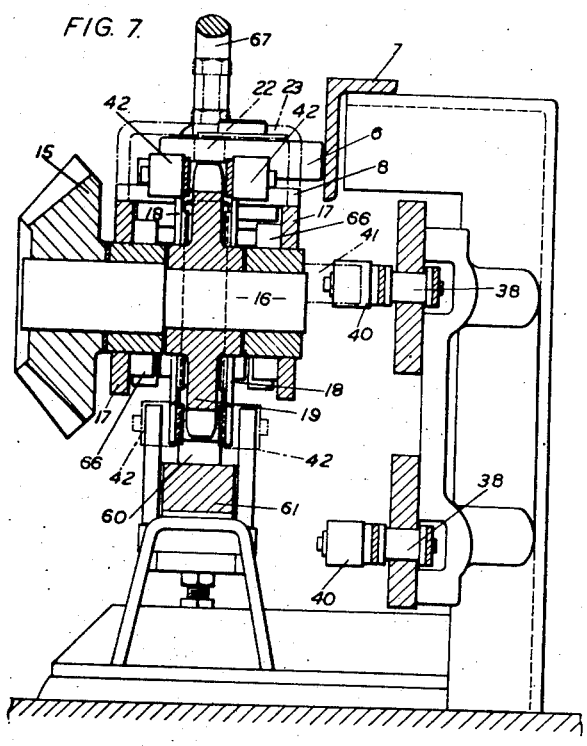
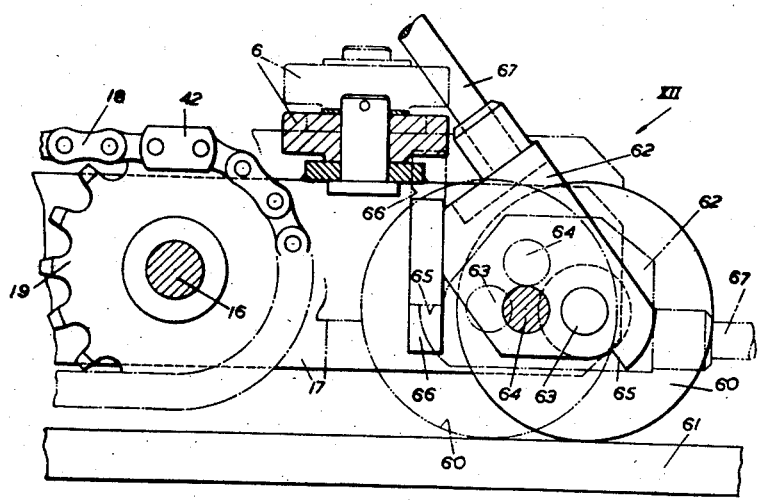

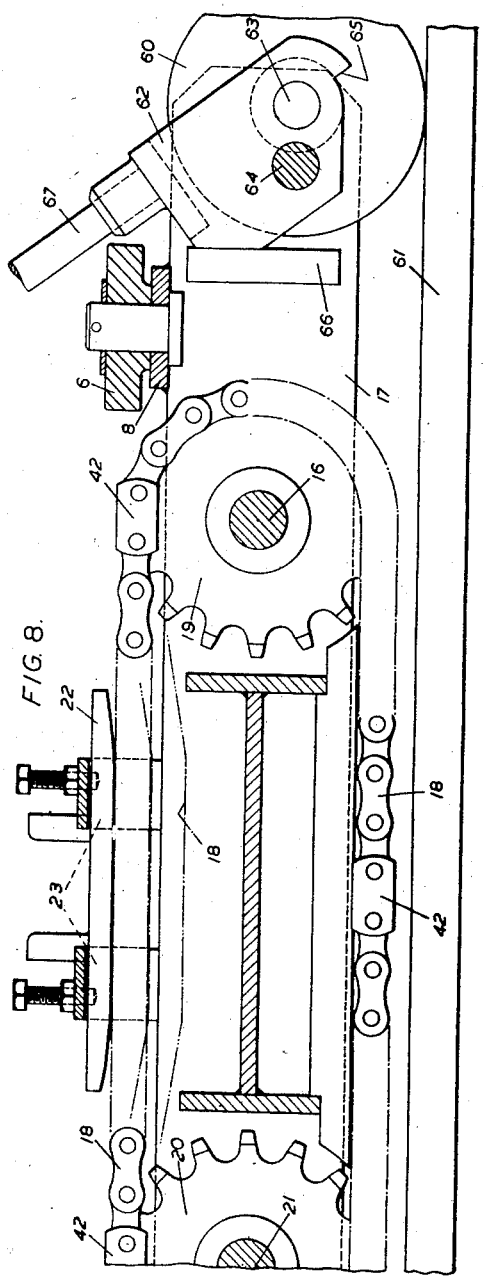

Inventor
JAMES W. SMITH
By

United States Patent Office 2,763,232
Patented Sept. 18, 1956

2,763,232

APPARATUS FOR TREATING WITH LIQUID A BODY HAVING IRREGULAR NON-SYMMETRICAL SURFACES

James William Smith, Surbiton, England, assignor to Carrier Engineering Company Limited, London, England, a British company Application February 5, 1954, Serial No. 408,538

Claims priority, application Great Britain February 14, 1953

21 Claims. (Cl. 118—6)

This invention relates to apparatus for treating with liquid a body having irregular non-symmetrical surfaces, for example a motor car body, when such bodies are being produced on a quantity production basis.

It has heretofore been proposed to effect liquid treatment of motor car bodies by supporting the bodies on mounts carried by a conveyor, to present each body in turn to a paint projecting device such as a paint sprayer or a paint flowing device while rotating the body about the axis of its mount, and to control the emission of paint according to the surface of the body presented for painting at a given instant, such control being effected by control cams rotated in synchronism with the rotation of the body about the axis of its mount. One such proposal is described in United States patent specification No. 2,598,246.

It is an object of the present invention to provide new means for obtaining synchronism of rotation of a body and of the cams for controlling operation of the liquid projecting device.

According to the present invention there is provided in a system for treating with liquid a body having irregular non-symmetrical surfaces, e. g. a motor car body, apparatus comprising a liquid projecting device, cams to control operation of said device, cam-operating means, a carriage, a conveyor to passage the carriage past said liquid projecting device, a mount for a body to be treated, said mount being supported by said carriage for rotation about the longitudinal axis of the mount, driving means to effect rotation of the mount, control means located alongside the path of the carriage in the vicinity of the liquid projecting device to control rotation of the mount, and a unitary coupling movable with said carriage to couple said control means and said driving means to couple the carriage to said cam-operating means whereby movement of the carriage effects rotation of the mount in timed relation with the operation of the cam-operating means as the carriage is passaged past the liquid projecting device.

Figure 10:
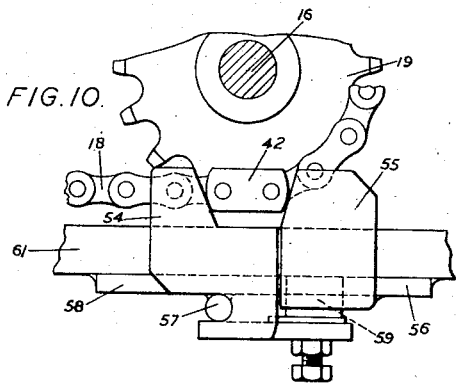
Figure 12:
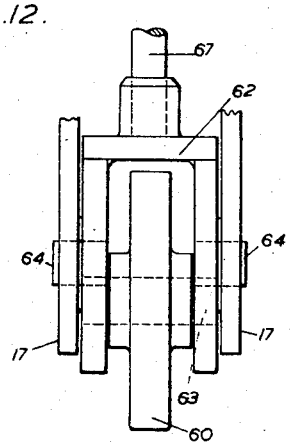

In order that the invention may be clearly understood one embodiment thereof will now be described, by way of example, with reference to the accompanying diagrammatic drawings in which:

Fig. 1 is a broken side elevation illustrating one carriage and mount for a body to be treated and some of the mechanism according to the invention, Fig. 2 is a top plan of Fig. 1, Fig. 3 is an elevation looking in direction of arrow III, Fig. 1, Fig. 4 is a diagrammatic side elevation illustrating a body being passaged past a paint spraying device, Fig. 5 is a top plan of a part of Fig. 4, Fig. 6 is an end view looking in the direction of arrow VI, Fig. 4, Fig. 7 is a section on line VIII—VII, Fig. 1, Fig. 8 is a section illustrating, to an enlarged scale, a part of the mechanism shown in Fig. 1, Fig. 9 is a side elevation of a socket having a fixed and a movable jaw, Fig. 10 is an elevation of another form of socket employed in apparatus according to the invention, Fig. 11 is a side elevation of mechanism for displacing apparatus according to the invention, and Fig. 12 is an end view looking in the direction of arrow XII, Fig. 11.

Fig. 13 is a diagrammatic illustration of a modification which may be embodied in the apparatus.

Referring to the drawing, a car body 1 is secured in known manner, to a mount 2 supported by a carriage 3 comprising a truck on wheels 4 which run in guide tracks 5, Fig. 3, the carriage being guided laterally by rollers 6 running on lateral guides 7, the rollers being supported by brackets 8 secured to the carriage 3.

The mount 2 is rotatable in bearings 9 carried by the carriage 3, the bearings being arranged to support the mount for rotation about a horizontal axis. Rotation of the mount 2 is effected by a sprocket 10, Figs. 1 to 3, chain 11, and a sprocket 12 which latter is secured to a shaft 13 supported by the carriage 3. The shaft 13 has a mitre gear 14, Fig. 2, secured thereto and meshing with a second mitre gear 15 secured to a spindle 16, Figs. 1 and 7, rotatably mounted in a frame 17 secured to the carriage for movement therewith.

Rotation of shaft 16 is effected by an endless chain loop 18 which is passed around sprockets 19, 20, Figs. 1 and 8, of which the sprocket 19 is secured to spindle 16 and sprocket 20 is secured to a second spindle 21 also rotatably mounted in the frame 17. The chain loop 18 is a tight chain, the slack of which is normally taken up by a tensioner 22 slidable in guides 23 carried by the frame 17. he arrangement of the chain loop is more clearly illustrated in Fig. 8.

The carriage 3 is connected to a towing conveyor 24, Fig. 3, which is driven in any suitable manner, not shown to move a succession of carriages 3 in the direction of the arrow A, Figs. 1 and 4, past a paint spraying device illustrated diagrammatically at 25, Figs. 4, 5 and 6. The construction and mode of operation of the paint spraying device 25 forms no part of the present invention, but may, if desired, be of the kind described in the aforementioned specification No. 2,598,246, the operation of the device 25 and the flow of paint thereto being controlled by two or more cams of a set 26, such cams being supported by a rotatable cam shaft 27 common thereto. The means for rotating shaft 27 comprises a bevel gear 28 secured to shaft 27 and meshing with a further bevel gear 29 which latter is secured to a spindle 30 to which is also secured a further bevel gear 31 meshing with a bevel gear 32 secured to a shaft 33 which latter shaft also has secured thereto a bevel gear 34 meshing with a bevel gear 35 secured to a shaft 36 to which is also secured a sprocket 37. An endless chain 38 passes around the sprocket 37 and also around a further sprocket 39, and to the chain 38 are secured a plurality of driving blocks 40 disposed at equispaced intervals along the chain to be engaged by a block-engaging member 41, Figs. 4 and 7, carried by and projecting laterally from the frame 17.

The endless chain loop 18 carries at equi-spaced intervals at least three socket-engaging members 42 for sequential co-operation with successive ones of a plurality of sockets 43, Fig. 1, disposed at equi-spaced intervals alongside the path of the carriage in the vicinity of the liquid projecting device 25. In the embodiment of the invention herein described four sockets 43 are disposed at equi-spaced distances alongside the path of the carriage 3 as indicated in Fig. 1, the arrangement being such that, considered in the direction of movement of the carriage, as the carriage approaches the first of the sockets, that socket-engaging member 42 which is on the lower run of the endless chain loop 18 will become engaged in the first socket and will be held by the socket while the carriage 3 continues its forward movement.

As the socket-engaging member 42 is held by the first of the sockets, the chain loop 18 effects rotation of the sprockets 19 and 20 and thus, through chain 11, rotates the mount 2 about the horizontal axis thereof. During this movement of the carriage the slack in chain 18 is taken up until the next socket-engaging member 42 is engaged and held by the second of the sockets 43, whereupon the first mentioned member 42 is released from the first socket and the continued movement of carriage 3 moves the frame 17 to a position at which the third member 42 is engaged in the third socket 43. It will therefore be understood that the continued forward movement of the carriage 3 provides a caterpillar movement of the chain 18 and by so doing provides a steady rotation of the mount 2 with the car body 1 thereon. The number of sockets 43 and the spacing thereof is so chosen that rotation of the mount 2 and body 1 continues at least until the body 1 has been completely passaged past the spraying device 25. It will also be understood from the foregoing that by reason of the block engaging member 41 on frame 17 engaging with a block 40 on endless chain 38, the chain 38 is also rotated during the passage of the carriage past the spraying device 25 thereby effecting rotation of cam shaft 27 to permit the required control of the device 25 by the cams 26. Accordingly, rotation of the cam shaft 27 and of the mount 2 is effected in timed relation by movement of the carriage 3 past the liquid projecting device 25 during co-operation of a block-engaging member 41 with a block 40 and a socket-engaging member 42 with a socket 43.

The caterpillar action of chain 18 commenced when a socket-engaging member 42 is engaged by the first socket 43, this being irrespective of the angular position occupied by the body 1 at that particular time, but as the carriage 3 is moved forward there comes a point at which one of the members 42 has its centre line aligned with the axis of the sprocket 19 and when this occurs the body 1 is in the "road-wise" position thereof as illustrated in Fig. 1, this being the position required as the body begins its passage past the spraying device 25. This position may, in some instances, not occur until the axis of the socket 19 is co-incident with the centre line of the second socket 43, considered in the direction of movement of the carriage 3. By this means it is ensured that no matter what angular position the body occupies before the first member 42 is engaged with the first socket 43, the combined movement of the carriage 3 and the caterpillar action of chain 18 will ensure that, after engagement of the first member 42 with the first socket 43 the angular position of the body will be predetermined for each successive position along the track after engagement of the second member 42 with the second socket 43.

As shown in the drawings, the socket-engaging members 42 comprise blocks having two opposed flat sides, the upper and lower sides as viewed in Figs. 1 and 8 to 10, and according to the angular position of the body 1 it may sometimes happen that a flat side of a member 42 is presented to the first socket 43. If this should happen the upper edge of the socket may dig into the flat face of the member 42 and prevent or hinder the proper location of the member in the socket. To accommodate this condition, the frame 17 carries a trip member 44, Fig. 1, which will engage a pivoted arm 45 connected by a spring 46 with a pivoted selector member 47. Engagement of trip member 44 with arm 45 causes the latter to be depressed thereby rocking selector member 47 clockwise, as viewed in Fig. 1, against the action of the spring 46 and interposing the selector member 47 into the path of the mal-positioned socket-engaging member 42 so that it engages such member 42 and causes the loop chain 18 to be moved a short distance so that the member 42 is properly located for co-operation with the first socket 43.

It will be understood that, if desired, instead of the socket-engaging members 42 having flat faces as just described, the members 42 may comprise rollers.

From Fig. 1 it will be observed that the form of the first socket 43 is different from that of the succeeding three sockets. The first socket 43 comprises a fixed jaw 49, Figs. 1 and 9, and a moving jaw 50. The moving jaw 50 is freely movable on a pivot 51 and is urged by a spring 52, Fig. 9, to the normal position thereof. The moving jaw 50 has a sloping face 53 which is engaged by the socket-engaging member 42 approaching it, the jaw 50 thus being pressed downwards against spring 52 by the member 42 to facilitate entry of the member 42 into the socket. When the member 42 has entered the socket, the spring 52 restores the jaw 50 to the normal position thereof.

Each of the other sockets 43 is of the construction shown in Fig. 10 and comprises two jaw portions 54 and 55 of which the jaw 55 is rigidly secured, for example by welding, to a stationary member 56 and the jaw 54 is engaged by a fixed bar 57 and an abutment 58, being urged towards the bar 57 and abutment 58 by a resilient pad or the like 59, such arrangement being to reduce backlash and to re-act against any condition of over-drive to which the socket may be subjected by a member 42 and chain 18.

Should the bodies 1 not be properly balanced on the mounts 2 this may, in some instances, result in uneven initial rotation of shaft 16 so that the bodies are not being rotated at the desired angular velocity when full control thereof is assumed by co-operation between a socket-engaging member 42 and the second socket 43. To counter the condition where bodies are improperly balanced about their mounts 2 the first and second sockets, while being maintained in fixed relation one to the other, may be supported for simultaneous movement towards and away from the third socket 43 and so controlled that they are movable towards the third socket with a gradual acceleration which exerts a pull on the chain loop 18 thereby to control rotation of shaft 16 and ensure that a body is rotated at the desired angular velocity when a member 42 is fully co-operative with the second socket 43. One way of effecting this is illustrated diagrammatically in Fig. 13 in which the first and second sockets 43 are shown as being mounted on a socket-supporting member shown as a slide 70 supported for lengthwise movement by freely rotatable rollers 71, and the third and fourth sockets 43 are supported in fixed positions.

The slide 70 is guided for lengthwise movement by guides, not shown, and is reciprocated by actuating means comprising a rod 72 connected thereto and to a piston 73 working in an air cylinder 74. The piston 73 is controlled by compressed air which enters the cylinder 74, from a source of supply not shown, through one or other of two air lines 75, 76 located at opposite ends of the cylinder. Included in the air line 75 is a first normally closed valve 77 having a meshing trip member 78 co-operating therewith and with the second socket 43 in a manner such that the trip member 78 is operated to open the valve 77 when a socket-engaging member is entered into the second socket 43. A second normally closed valve 79 is included in the air line 76 and has a re-setting trip member 80 co-operating therewith and with the fourth socket 43, the member 80 being operated to open valve 79 when a socket engaging member is entered into the fourth socket 43.

The second and third sockets 43 are normally spaced apart by a predetermined distance greater than that at which a socket-engaging member 42 can be engaged in the third socket while still engaged in the second socket and as a socket-engaging member 42 enters the second socket 43 it depresses the meshing trip member 78 thereby gradually opening valve 77 to admit air through the air line 75 to move the piston 73 and slide 70 forward, that is to the right as viewed in Fig. 13, with a gradual acceleration thereby to exercise a pull on the chain loop 18 to effect rotation of shaft 16 and ensure that when the next succeeding member 42 is in position to be engaged with the third socket 43 the shaft 16, then under control of a member 42 engaged with the second socket 43, is rotating at the desired angular velocity. The forward movement of the slide is arrested by abutment thereof with the fixed element on which are mounted the third and fourth sockets 43, the second and third sockets then being spaced apart by the required distance so that a member 42 can be entered into the third socket and removed from the second socket as described above.

As a member 42 enters the fourth socket 43 it depresses the re-setting trip member 80 thus opening valve 79 and permitting air to flow along air line 76 to return slide 70 to the starting position thereof it being understood that at this time the valve 77 will have been restored to the normally closed condition thereof.

The air lines 75, 76 also include manually pre-settable throttles 81, 82, 83 by which the air flow is controlled according to the loads to be expected during a run of the apparatus so that the gradual acceleration applied to the slide 70 is maintained as consistent as possible for all loads during the run.

It is sometimes desired that a body 1 on a mount 2 be passed through a painting station at which is located a device 25 without being rotated about the axis of the mount 2 and without the device 25 being operated. To accommodate this requirement, apparatus according to the invention includes manually operable disabling means to move the frame 17 to a position at which the socket-engaging members 42 and the block-engaging member 41 are respectively rendered incapable of co-operation with the sockets 43 and with a driving block 40 during passage of the carriage 3 past the device 25.

The disabling means comprise a rotatable roller 60 to run on a track member 61 secured in fixed relation to the sockets 43 and to the path of the chain 38 for rotating the cam shaft 27. A bracket 62 supports a roller 60 for rotation about a spindle 63 carried by the bracket. Pins 64, Figs. 11 and 12, are secured to the bracket 62 and are rotatable in the frame 17, the axes of pins 64 being aligned with each other and eccentric to and parallel with the axis of rotation of the roller 60. The bracket 62 is provided with a shoulder 65 which, as indicated in full line in Fig. 11 is normally disengaged from an abutment 66 fixed to frame 17, and a lever 67 is secured to bracket 62 to permit the bracket manually to be moved angularly about the pins 64 so that the shoulder 65 is engaged with the abutment 66 to raise the carriage 3 relative to track 61 as indicated in chain line in Fig. 11. During the angular movement of bracket 62, roller 60 acts as a fulcrum about which the frame 17 and the carriage 3 is raised in relation to the track 61 thereby raising the socket-engaging members 42 and the block-engaging member 41 for a distance of about one inch. With the frame and carriage raised in the manner just described the socket-engaging members 42 and the block-engaging member 41 are raised to a position at which, as the carriage 3 is passaged past the painting machine, they cannot respectively be engaged with the sockets 42 and a block 40 and accordingly the carriage in this position is passaged past the painting machine without rotation of the mount 2 and without operation of the spraying device 25.

It will be understood by those skilled in the art that although in the foregoing description a rotatable mount has been described as fitted to a carriage 3 comprising a wheeled truck, the mount 2 may, if desired, be supported for passage past the painting apparatus by a form of carriage other than that described herein.

I claim:

1. In a system for treating with liquid a body having irregular non-symmetrical surfaces, e. g. a motor car body, apparatus comprising a liquid projecting device, cams to control operation of said device, cam-operating means including a rotatable shaft, an endless chain to effect rotation of the shaft, and driving blocks supported by and disposed at equi-spaced intervals along the chain, a carriage, a conveyor to passage the carriage past the liquid projecting device, a mount for a body to be treated, said mount being supported by said carriage for rotation about the longitudinal axis of the mount, driving means including an endless chain loop to effect rotation of the mount, a plurality of sockets disposed at equi-spaced intervals alongside the path of the carriage in the vicinity of the liquid projecting device to control initial rotation and rotation of the mount, a frame mounted on said carriage for movement therewith and supporting rotatable sprockets for said chain loop, at least three equi-spaced socket-engaging members supported by the chain loop for sequential co-operation with successive ones of said sockets, and a block-engaging member carried by said frame to co-operate with one of said blocks, rotation of said shaft and mount being effected in timed relation by movement of the carriage past the liquid-projecting device during co-operation of said block-engaging member with a driving block and of a socket-engaging member with a socket.

2. Apparatus according to claim 1, wherein the first of said sockets considered in the direction of movement of the carriage comprises a moving jaw and a fixed jaw, the moving jaw being pivotally mounted for movement about its pivot by a socket-engaging member entering the socket to facilitate entry of the member into the socket and resiliently urged to the normal position thereof in relation to said fixed jaw.

3. Apparatus according to claim 2, including a selector member mounted in advance of the first of said sockets considered in the direction of movement of the carriage and a trip member supported by said frame to move the selector member into the path of a socket-engaging member approaching said first socket thereby to condition the socket-engaging member for engagement with the socket in the event that the socket-engaging member is only partially positioned for proper engagement with the socket.

4. Apparatus according to claim 1, including a selector member mounted in advance of the first of said sockets considered in the direction of movement of the carriage and a trip member supported by said frame to move the selector member into the path of a socket-engaging member approaching said first socket thereby to condition the socket-engaging member for engagement with the socket in the event that the socket-engaging member is only partially positioned for proper engagement with the socket.

5. Apparatus according to claim 1, including a socket-supporting member mounted for lengthwise reciprocation and carrying the two sockets first to co-operate with socket-engaging members, actuating means co-operating with the socket-suporting member to effect reciprocation thereof, a first control means operable by a socket-engaging member entering into co-operation with the second of said two sockets to be engaged by the socket-engaging member thereby to effect operation of the actuating means to cause movement of the socket-supporting member from the starting position thereof with a steady acceleration in the direction of movement of said carriage during movement of the carriage, and a second control means operable by a socket-engaging member entering into co-operation with a socket in advance of said second socket considered in the direction of movement of the carriage thereby to effect operation of the actuating means to restore the socket-supporting member to the starting position thereof.

6. Apparatus according to claim 5, wherein the actuating means comprises a cylinder, air lines connecting the opposite ends of the cylinder with a source of compressed air, and a piston reciprocable in said cylinder and connected with said socket-supporting member, and wherein the first and second control means each comprises a trip member co-operating with a socket and operable by engagement thereof with a socket-engaging member entering into co-operation with the socket, and a valve located in one of said air lines and co-operating with said trip member thereby to permit compressed air to pass through the air line to the cylinder.

7. Apparatus according to claim 4, including a socket-supporting member mounted for lengthwise reciprocation and carrying the two sockets first to co-operate with socket-engaging members, actuating means co-operating with the socket-supporting member to effect reciprocation thereof, a first control means operable by a socket-engaging member entering into co-operation with the second of said two sockets to be engaged by the socket-engaging member thereby to effect operation of the actuating means to cause movement of the socket-supporting member from the starting position thereof with a steady acceleration in the direction of movement of said carriage during movement of the carriage, and a second control means operable by a socket-engaging member entering into cooperation with a socket in advance of said second socket considered in the direction of movement of the carriage thereby to effect operation of the actuating means to restore the socket-supporting member to the starting position thereof.

8. Apparatus according to claim 7, wherein the actuating means comprises a cylinder, air lines connecting the opposite ends of the cylinder with a source of compressed air, and a piston reciprocable in said cylinder and connected with said socket-supporting member, and wherein the first and second control means each comprises a trip member co-operating with a socket and operable by engagement thereof with a socket-engaging member entering into co-operation with the socket, and a valve located in one of said air lines and co-operating with said trip member thereby to permit compressed air to pass through the air line to the cylinder.

9. Apparatus according to claim 1, including manually operable disabling means to move said frame to a position at which the socket-engaging members and the block-engaging member are respectively rendered incapable of co-operation with the sockets and a driving block during passage of the carriage past the liquid projecting device.

10. Apparatus according to claim 9, wherein the disabling means comprises a rotatable roller to run on a track member fixed in relation to said sockets and to the endless chain for rotating said cam shaft, a bracket supporting said roller for rotation and pivoted to the frame for movement about an axis eccentric to and parallel with the axis of rotation of the roller, an abutment carried by said frame, a shoulder on said bracket normally disengaged from said abutment, and a lever secured to the bracket whereby the bracket may be moved angularly about the pivot therefor into engagement with said abutment while the roller acts as a fulcrum about which the frame and the carriage are raised in relation to said track thereby to raise the socket-engaging members and the block-engaging member and render them respectively incapable of co-operation with the sockets and a driving block.

11. Apparatus according to claim 7, including manually operable disabling means to move said frame to a position at which the socket-engaging members and the block-engaging member are respectively rendered incapable of co-operation with the sockets and a driving block during passage of the carriage past the liquid projecting device.

12. Apparatus according to claim 11, wherein the disabling means comprises a rotatable roller to run on a track member fixed in relation to said sockets and to the endless chain for rotating said cam shaft, a bracket supporting said roller for rotation and pivoted to the frame for movement about an axis eccentric to and parallel with the axis of rotation of the roller, an abutment carried by said frame, a shoulder on said bracket normally disengaged from said abutment, and a lever secured to the bracket whereby the bracket may be moved angularly about the pivot therefor into engagement with said abutment while the roller acts as a fulcrum about which the frame and the carriage are raised in relation to said track thereby to raise the socket-engaging members and the block-engaging member and render them respectively incapable of co-operation with the sockets and a driving block.

13. In a system for treating with liquid a body having irregular non-symmetrical surfaces, e. g. a motor car body apparatus comprising a liquid projecting device, cams to control operation of said device, a rotatable cam shaft common to said cams, shaft rotating means to effect rotation of the cam shaft and including an endless chain supporting driving blocks disposed at equi-spaced intervals along the chain, a carriage, a conveyor to passage the carriage past the liquid projecting device, a mount for a body to be treated, said mount being supported by the carriage for rotation about a horizontal axis, driving means including an endless chain loop to effect rotation of the mount, a plurality of sockets disposed at equi-spaced intervals alongside the path of the carriage in the vicinity of the liquid projecting device to control initial rotation and rotation of the mount, a frame mounted on said carriage for movement therewith and supporting rotatable sprockets for said chain loop, at least three equi-spaced socket-engaging members supported by the chain loop for sequential co-operation with successive ones of said sockets, and a block-engaging member carried by said frame to co-operate with one of said driving blocks, rotation of said cam shaft and mount being effected in timed relation by movement of the carriage past the liquid projecting device during co-operation of said block-engaging member with a driving block and of a socket-engaging member with a socket.

14. Apparatus according to claim 13, wherein the first of said sockets considered in the direction of movement of the carriage comprises a moving jaw and a fixed jaw, the moving jaw being pivotally mounted for movement about its pivot by a socket-engaging member entering the socket to facilitate entry of the member into the socket and resiliently urged to the normal position thereof in relation to said fixed jaw.

15. Apparatus according to claim 14, including a selector member mounted in advance of the first of said sockets considered in the direction of movement of the carriage and a trip member supported by said frame to move the selector member into the path of a socket-engaging member approaching said first socket thereby to condition the socket-engaging member for engagement with the socket in the event that the socket-engaging member is only partially positioned for proper engagement with the socket.

16. Apparatus according to claim 13, including a socket-supporting member mounted for lengthwise reciprocation and carrying the two sockets first to co-operate with socket-engaging members, actuating means co-operating with the socket-supporting member to effect reciprocation thereof, a first control means operable by a socket-engaging member entering into co-operation with the second of said two sockets to be engaged by the socket-engaging member thereby to effect operation of the actuating means to cause movement of the socket-supporting member from the starting position thereof with a steady acceleration in the direction of movement of said carriage during movement of the carriage, and a second control means operable by a socket-engaging member entering into co-operation with a socket in advance of said second socket considered in the direction of movement of the carriage thereby to effect operation of the actuating means to restore the socket-supporting member to the starting position thereof.

17. Apparatus according to claim 16 wherein the actuating means comprises a cylinder, air lines connecting the opposite ends of the cylinder with a source of compressed air, and a piston reciprocable in said cylinder and connected with said socket-supporting member, and wherein the first and second control means each comprises a trip member co-operating with a socket and operable by engagement thereof with a socket-engaging member entering into co-operation with the socket, and a valve located in one of said air lines and co-operating with said trip member thereby to permit compressed air to pass through the air line to the cylinder.

18. Apparatus according to claim 13, including manually operable disabling means to move said frame to a position at which the socket-engaging members and the block-engaging member are respectively rendered incapable of co-operation with the sockets and a driving block during passage of the carriage past the liquid projecting device.

19. Apparatus according to claim 18, wherein the disabling means comprises a rotatable roller to run on a track member fixed in relation to said sockets and to the endless chain for rotating said cam shaft, a bracket supporting said roller for rotation and pivoted to the frame for movement about an axis eccentric to and parallel with the axis of rotation of the roller, an abutment carried by said frame, a shoulder on said bracket normally disengaged from said abutment, and a lever secured to the bracket whereby the bracket may be moved angularly about the pivot therefor into engagement with said abutment while the roller acts as a fulcrum about which the frame and the carriage are raised in relation to said track thereby to raise the socket-engaging members and the block-engaging member and render them respectively incapable of co-operation with the sockets and a driving block.

20. Apparatus according to claim 17, including manually operable disabling means to move said frame to a position at which the socket-engaging members and the block-engaging member are respectively rendered incapable of co-operation with the sockets and a driving block during passage of the carriage past the liquid projecting device.

21. Apparatus according to claim 20, wherein the disabling means comprises a rotatable roller to run on a track member fixed in relation to said sockets and to the endless chain for rotating said cam shaft, a bracket supporting said roller for rotation and pivoted to the frame for movement about an axis eccentric to and parallel with the axis of rotation of the roller, an abutment carried by said frame, a shoulder on said bracket normally disengaged from said abutment, and a lever secured to the bracket whereby the bracket may be moved angularly about the pivot therefor into engagement with said abutment while the roller acts as a fulcrum about which the frame and the carriage are raised in relation to said track thereby to raise the socket-engaging members and the block-engaging member and render them respectively incapable of co-operation with the sockets and a driving block.

References Cited in the file of this patent

UNITED STATES PATENTS

| | | |
|---|---|---|
| 2,597,914 | Whitworth et al. | May 27, 1952 |
| 2,598,246 | Fowler | May 27, 1952 |
| 2,657,666 | Fowler | Nov. 3, 1953 |
| 2,678,548 | Schweitzer et al. | Mar. 30, 1954 |